United States Patent [19]

Kikuchi et al.

[11] Patent Number: 5,064,017
[45] Date of Patent: Nov. 12, 1991

[54] FOUR-WHEEL DRIVE MOTOR VEHICLE OF TRANSVERSELY-DISPOSED ENGINE TYPE

[75] Inventors: Reiji Kikuchi; Naomune Moriyama; Takahito Yokouchi; Koichi Yamamoto, all of Hiroshima, Japan

[73] Assignee: Mazda Motor Corporation, Japan

[21] Appl. No.: 500,422

[22] Filed: Mar. 28, 1990

[30] Foreign Application Priority Data

Mar. 28, 1989 [JP] Japan .................................. 1-76148

[51] Int. Cl.⁵ ....................... B60K 17/344; B60K 5/04
[52] U.S. Cl. ..................................... 180/248; 180/297
[58] Field of Search ....................... 74/665 F, 665 T, ; 180/247, 248, 233, 252, 140, 249, 297; 475/164, 206

[56] References Cited

U.S. PATENT DOCUMENTS

| 863,406 | 8/1907 | Labus et al. | 180/297 |
|---|---|---|---|
| 2,804,158 | 8/1957 | Yunker | 180/140 X |
| 3,400,777 | 9/1968 | Hill | 74/665 T |
| 3,889,771 | 6/1975 | Kronogard | 180/248 |
| 4,541,503 | 9/1985 | Akutagawa et al. | 180/247 X |
| 4,650,202 | 3/1987 | Tsuzuki | 180/248 |
| 4,697,470 | 10/1987 | Sasaki et al. | 475/206 |
| 4,716,984 | 1/1988 | Hiramatsu et al. | 180/297 |
| 4,723,624 | 2/1988 | Kawasaki et al. | 180/247 |
| 4,817,753 | 4/1989 | Hiketa | 180/249 |
| 4,895,217 | 1/1990 | Hueckler et al. | 180/248 X |

FOREIGN PATENT DOCUMENTS

| 327761 | 8/1989 | European Pat. Off. | 180/247 |
|---|---|---|---|
| 60-179334 | 9/1985 | Japan . | |
| 63-103735 | 10/1986 | Japan . | |
| 63-23219 | 6/1988 | Japan . | |

Primary Examiner—Charles A. Marmor
Assistant Examiner—Kevin Hurley
Attorney, Agent, or Firm—Thompson, Hine and Flory

[57] ABSTRACT

In the four-wheel-drive motor vehicle of transversely-disposed type, a front differential and a center differential are arranged coaxially on the axle line of front wheels, and an engine and a transmission are disposed transversely to the vehicle body in the rear of these differentials. This arrangement can relieve one-sided action of the vehicle body weight on the front wheels.

7 Claims, 5 Drawing Sheets

FOUR-WHEEL DRIVE MOTOR VEHICLE OF TRANSVERSELY-DISPOSED ENGINE TYPE

BACKGROUND OF THE INVENTION

1. Field of the Invention

This invention relates to a four-wheel-drive motor vehicle with an engine which is disposed transversely at the front part of the vehicle body.

2. Description of the Prior Art

Generally, as disclosed by Japanese Patent Application Laying Open Gazette No. 60-179334, for example, the four-wheel-drive motor vehicle with a transversely-disposed engine has such a layout that a center differential which distributes driving torque from a transmission to the front wheel side and the rear wheel side and a front differential which distributes a part of driving torque from said center differential to the right and left front wheels are arranged coaxially on the axle line of the front wheels and in front of these differentials an engine and the transmission are disposed.

In the above case, however, as a power unit center which is the center of gravity of the engine and the transmission is positioned in the forward direction of the vehicle body from the front axle, the vehicle body weight acts on the front wheels fairly one-sidedly, with the result of bad influence on running stability, etc. This one-sidedness of the vehicle body weight to the front wheels is especially problematical to the high output of engine in recent years.

SUMMARY OF THE INVENTION

An object of the present invention is to relieve the one-sidedness of the vehicle body weight to the front wheels in the front-wheel-drive motor vehicle of a transversely-disposed engine type.

In order to attain the above object, the present invention provides such composition that a front differential and a center differential are arranged coaxially on the axle line of the front wheels and in the rear of these differentials an engine and a transmission are arranged transversely to the vehicle body.

Under the above composition, a power unit center which is the center of gravity of the engine and the transmission is positioned in the rear direction of the vehicle body from the front axle, whereby one-sided action of the vehicle body weight on the front wheels can be relieved to such extent which corresponds to the shifting of the power unit center rearwardly.

The above and other objects, features and advantages of the present invention will be understood more clearly by reading the following description of preferred embodiments, with reference to the accompanying drawings.

BRIEF DESCRIPTION OF THE DRAWINGS

The attached drawings show preferred embodiments of the present invention.

FIG. 1–FIG. 5 show the first embodiment of the present invention in which:

FIG. 1 is a developed cross section, showing the composition of a main part of a four-wheel drive system, developed along the A—A line in FIG. 5;

FIG. 2 is a schematic drawing, showing the whole composition of a four-wheel-drive motor vehicle and showing the output part of a transmission and thereabouts, developed along the A—A line in FIG. 5;

FIG. 3 and FIG. 4 are a plan view and a side view respectively, each showing the arrangement of an engine, etc. at the front part of the vehicle body.

FIG. 5 is an arrangement drawing, showing the positional relations of each member, in the case where a main part of the four-wheel drive system is viewed from the left side of the vehicle body.

DETAILED DESCRIPTION OF THE INVENTION

A description is made below of preferred embodiment of the present invention, on the basis of the attached drawings.

Figure 2:
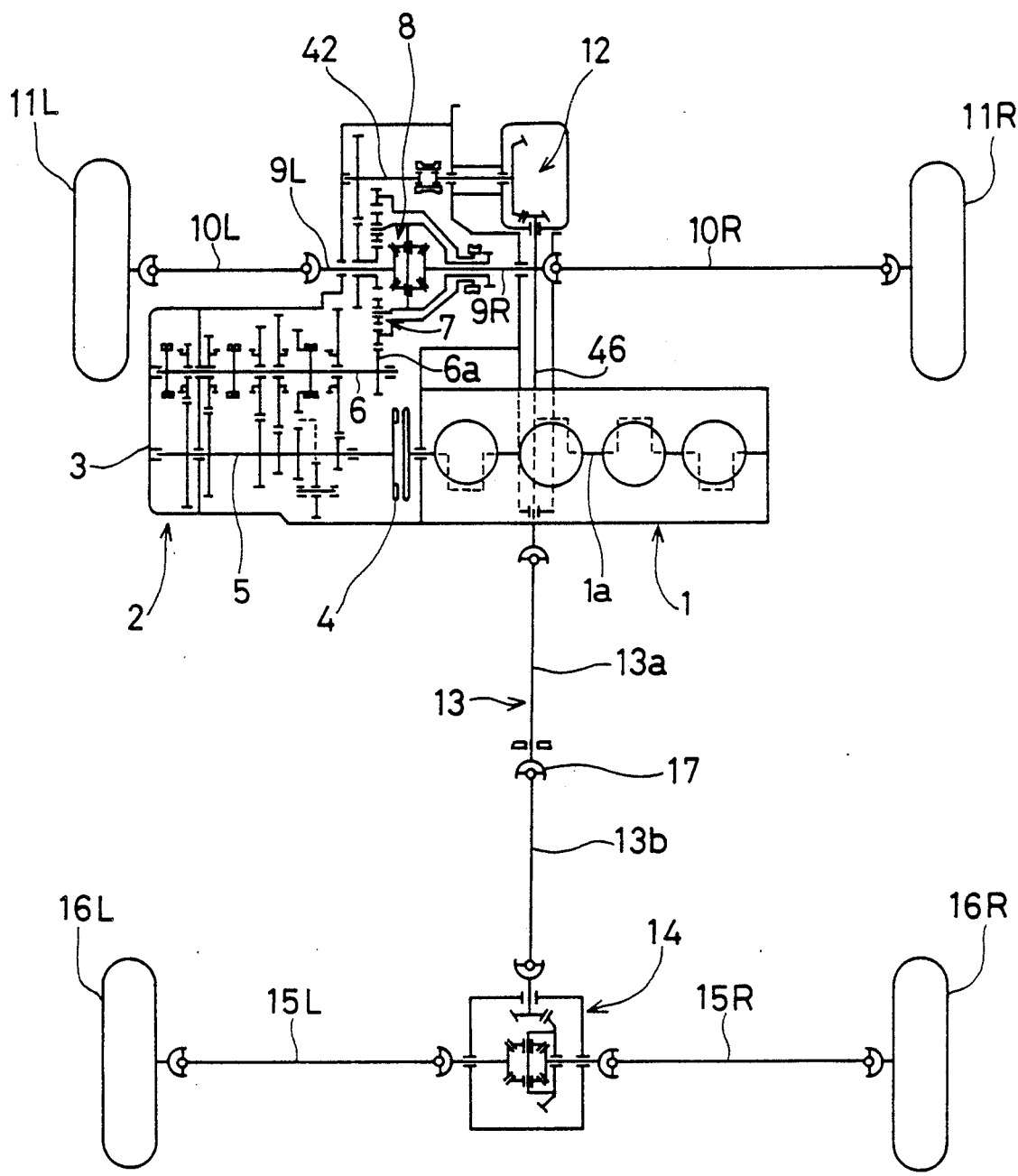

FIG. 2 shows a rough whole composition of a four-wheel drive system of the first embodiment of the present invention. Reference number 1 designates a 4-cylindered engine mounted at the front part of a vehicle body. A crank shaft 1a which is an output shaft of the engine 1 is disposed transversely or extending in the direction of vehicle width. Reference number 2 designates a gear type transmission mounted transversely to the left side of the engine 1. This transmission 2 carries in a casing 3 a main shaft 5 which is connected to the crank shaft 1a of the engine 1 through the medium of a clutch system 4 and a secondary shaft 6 arranged in parallel with said main shaft 5. By means of changing a transmitting channel of a gear between both shafts 5, 6, a gear ratio or transmission ratio is changed over.

Reference number 7 designates a center differential which distributes driving torque from the transmission 2 to the front wheel side and the rear wheel side. Reference number 8 designates a front differential which distributes a part of driving torque from the center differential 7 to the right and left front wheels 11L, 11R via shafts 9L, 9R and drive shafts 10L, 10R which are axles. The center differential 7 and the front differential 8 are arranged coaxially on the axle line of the front wheels 11L, 11R. The engine 1 and the transmission 2 are arranged in the rear direction of the vehicle body from both differentials 7, 8.

Reference number 12 designates a transfer mechanism. This transfer mechanism transmits the remaining part of driving torque from the center differential 7 to a propeller shaft 13 at the rear wheel side extending in the longitudinal direction of the vehicle body. The propeller shaft 13 comprises plural (two in the drawing) shafts 13a, 13b which are connected to each other through the medium of a universal joint 17. A rear end of the propeller shaft 13 (shaft 13b) is connected to a rear differential 14, which distributes driving torque to the right and left rear wheels 16L, 16R via axles 15L, 15R.

Figure 1:
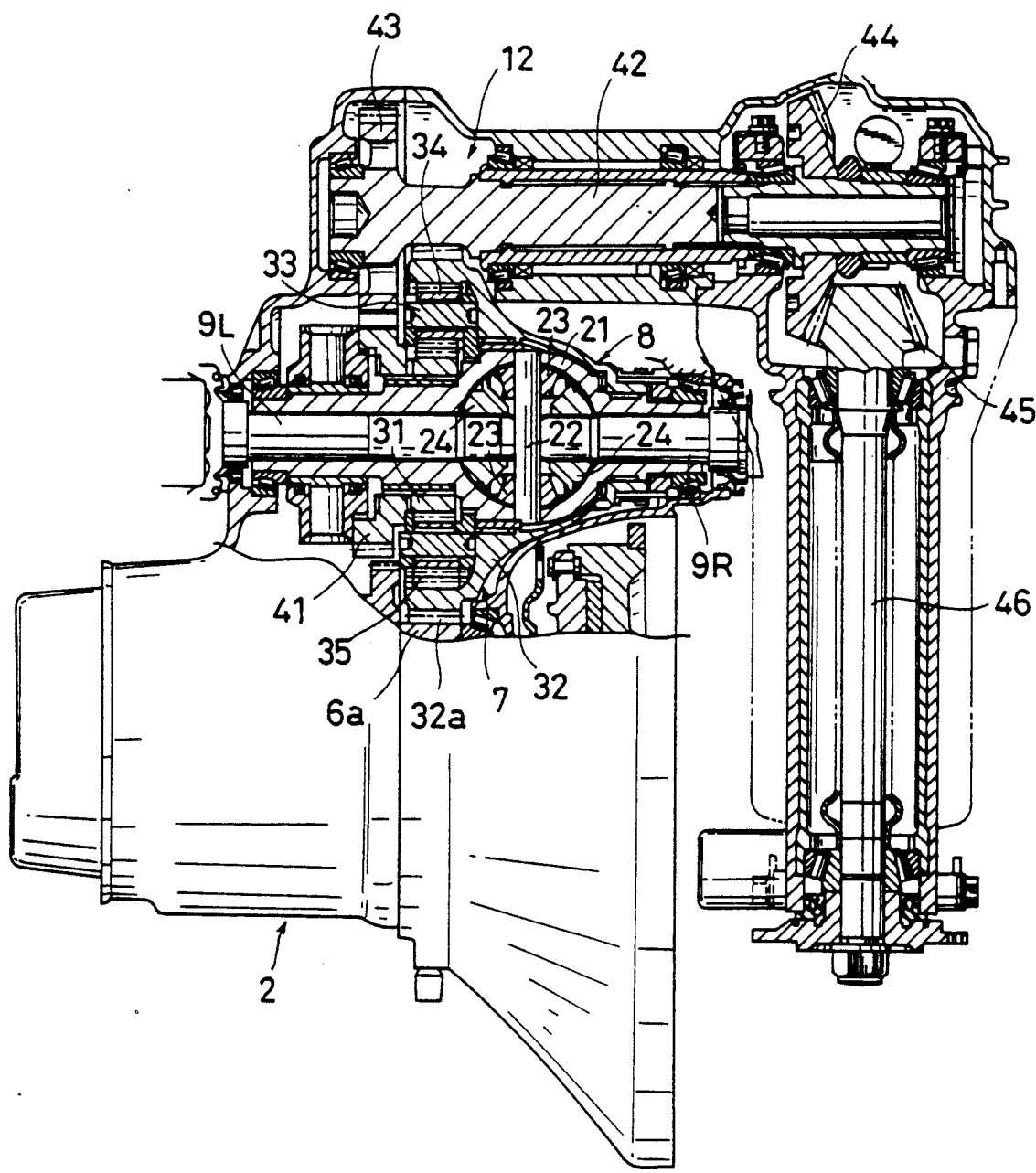

FIG. 1 shows a concrete construction of the center differential 7, the front differential 8 and the transfer mechanism 12. In FIG. 1, the front differential 8 is provided with a pair of pinion gears 23 supported rotatably by a differential case 21 through the medium of a pinion shaft 22 and a pair of side gears 24, each of which meshes with the respective pinion gear 23 and is connected to an end (inner end) of the right and left shafts 9L, 9R. The differential case 21 is mounted rotatably on the axle shafts 9L, 9R.

The center differential 7 is composed of a planetary gear mechanism of double pinion type which makes a sun gear 31 and a ring gear 32 mesh and connect with each other through the medium of pinion gears 34, 35 of two systems which are supported by a pinion carrier 33. The ring gear 32 extends to and covers the right side of the differential case 21 of the front differential 8. A gear 32a which meshes with an output gear 6a on the secondary shaft 6 of the transmission 2 is formed at the outer peripheral surface of the left end portion of the ring gear 32 which corresponds to the sun gear 31. The pinion carrier 33 is connected to the differential case 21 of the front differential 8 in such a fashion that the former rotates integrally with the latter.

The transfer mechanism 12 is provided with a first transfer gear 41 which is integral with the sun gear 31 of the center differential 7, and a second transfer gear 43 which is disposed rotatably with the left end portion of a transfer shaft 42 arranged in the direction of vehicle width and in parallel with the shafts 9L, 9R and which meshes with the first transfer gear 41, and a third and a fourth transfer gears 44, 45 comprising bevel gears which transmit rotation of a transfer shaft 42 to a transmission shaft 46 connected to the propeller shaft 13 (shaft 13a).

Figure 3:
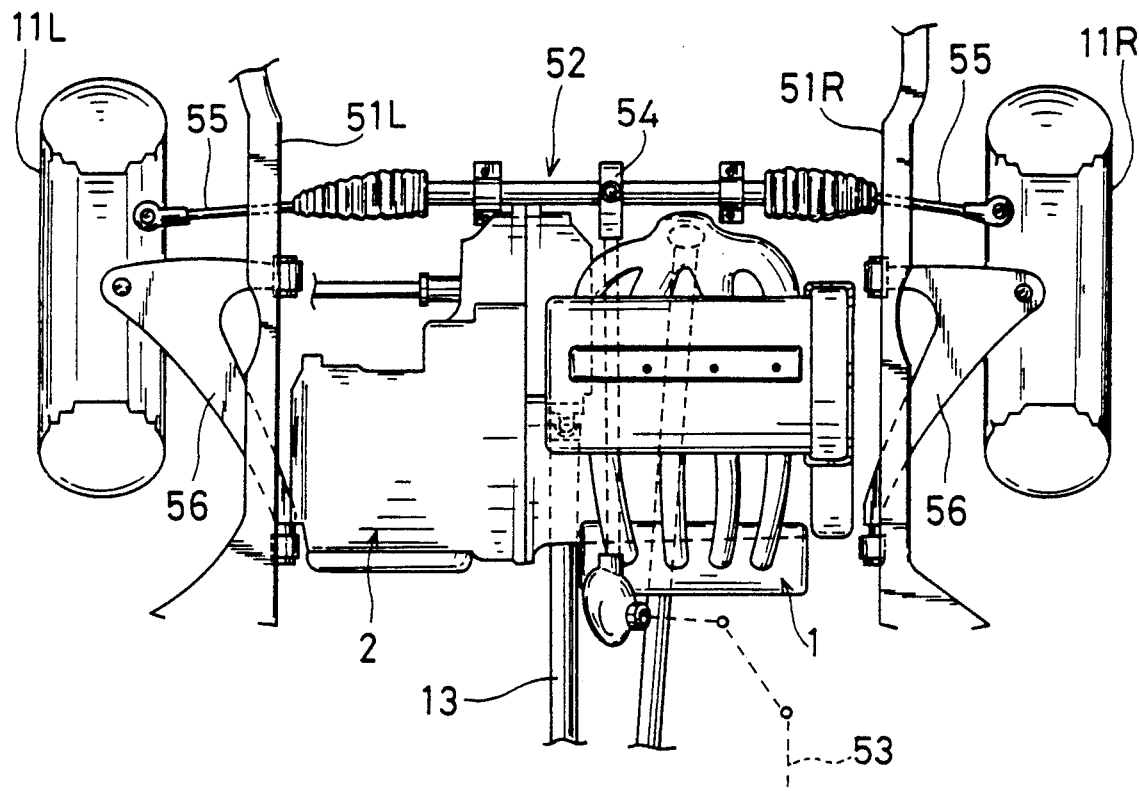
Figure 4:
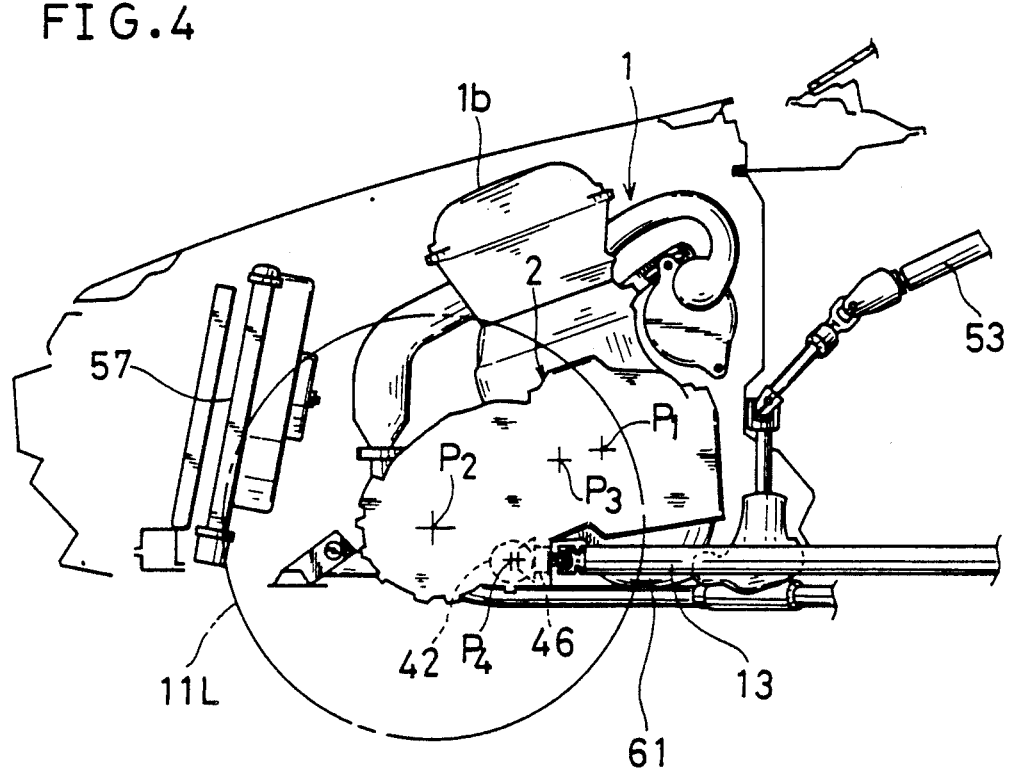
Figure 5:
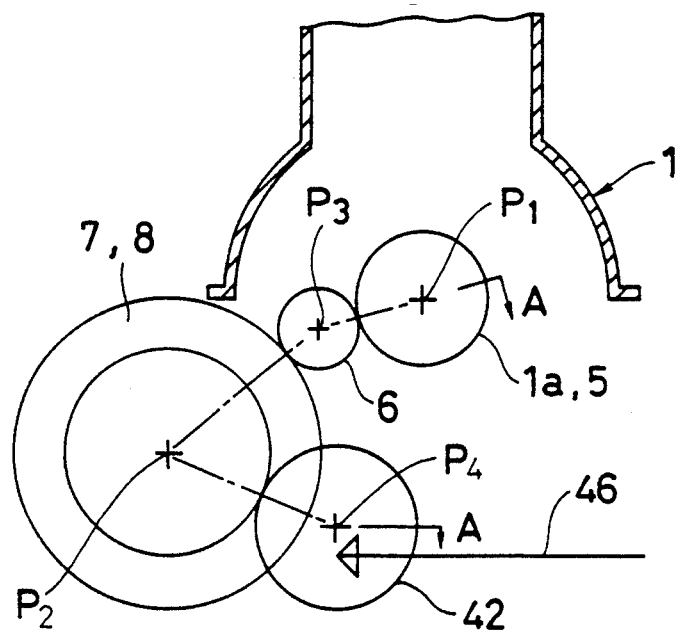

FIG. 3 to FIG. 5 show arrangement of the engine 1, the transmission 2, etc. at the front part of the vehicle body. In these figures, the engine 1 and the transmission 2 are supported on front frames 51L, 51R so that the axial center $P_1$ of the crank shaft 1a of the engine 1 and the main shaft 5 of the transmission 2 is positioned in the rear direction of the vehicle body from $P_2$ and above $P_2$ which is the axial center of the axle of front wheels 11L, 11R (namely, center of the center differential 7 and the front differential 8) and the engine 1 is disposed in such a fashion that its cylinder head 1b side (upper side) inclines diagonally and frontwardly as viewed in the direction of the crank shaft. $P_3$ which is the axial center of the secondary shaft 6 of the transmission 2 is located in the longitudinal direction of the vehicle body between $P_2$ which is the axial center of the front axle and $P_1$ which is the axial center of the crank shaft (main shaft). $P_4$ which is the axial center of the transfer shaft 42 is located between $P_2$ which is the axial center of the front axle and $P_1$ which is the axial center of the crank shaft in the longitudinal direction of the vehicle body and below $P_1$ and $P_2$, namely, the transfer shaft 42 is disposed in the so-called dead space between the crank shaft 1a and the front axle (shafts 9L, 9R and drive shafts 10L, 10R). From the transfer shaft 42, the transmitting shaft 46 and the propeller shaft 13 extend substantially horizontally toward the rear direction of the vehicle body. The propeller shaft 13 is arranged in the longitudinal direction of the vehicle body under the engine 1, passing the side (this side in FIG. 4) of an oil pan 61. In FIG. 1 and FIG. 2, the transfer shaft 42 is shown to be located in front of shafts 9L, 9R and drive shafts 10L, 10R which are front. This is because FIG. 1 and FIG. 2 are the development along the line A—A in FIG. 5 and in reality, the transfer shaft 42 is located in the rear of the front axle.

In FIG. 3 and FIG. 4, reference number 52 designates a steering system. This steering system is so composed that steering power of a steering handle (not shown in the drawing) is transmitted to the right and left front wheels 11L, 11R via a steering shaft 53, a rack & pinion mechanism 54 and tie rods 55, etc. so as to steer the front wheels 11L, 11R right and left. The steering shaft 53 is arranged under the engine 1 from the passenger compartment side and is connected to the rack & pinion mechanism 54 which is arranged in front of the engine 1. Reference number 56 designates a suspension arm which connects front wheels 11L, 11R to the vehicle body (front frames 51L, 51R) and reference number 57 designates a radiator.

In the above first embodiment, since the engine 1 and the transmission 2 are arranged in the rear of the axle line of the front wheels 11L, 11R (shafts 9L, 9R and drive shafts 10L, 10R), this arrangement can relieve the one-sided action of the vehicle body weight on the front wheels 11L, 11R and contributes to the improvement of running stability.

As the transfer shaft 42 of the transfer mechanism 12 which transmits motive power from the center differential 7 to the rear wheel side is arranged in the so-called dead space between the axle of front wheels 11L, 11R and the crank shaft 1a of the engine 1 in the longitudinal direction of the vehicle body, this arrangement of the transfer shaft 42 and in its turn, the arrangement of the transfer mechanism results in reducing the length of the power unit including the engine 1, the transmission 2, etc. in the longitudinal direction and in the vertical direction. Thus, good compactness of the power unit can be planned. Moreover, this arrangement has such advantage that the transmitting shaft 46 and propeller shaft 13 can be disposed easily, without interfering with the engine 1 and the transmission 2.

Figure 6:
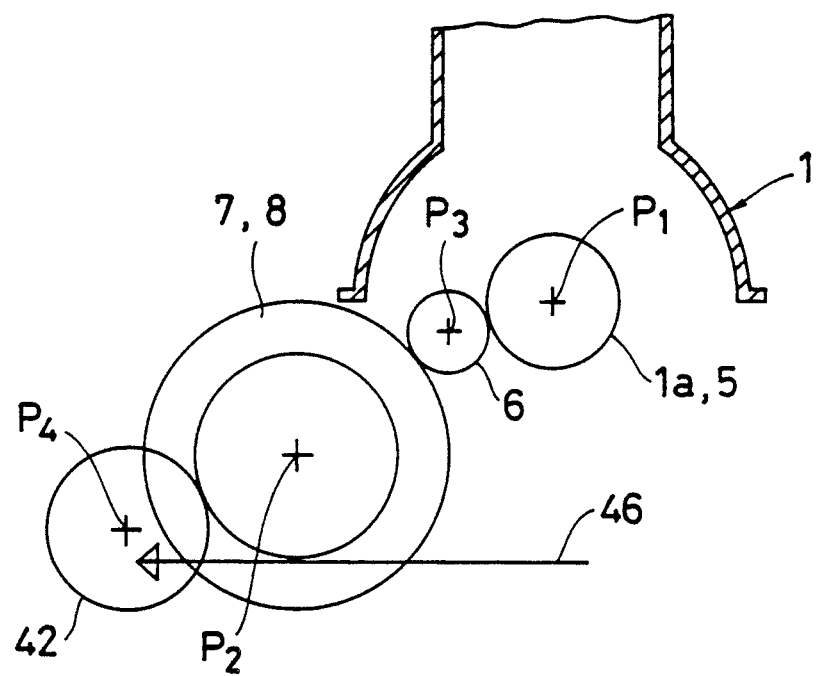
FIG. 6–FIG. 8 show respectively the second embodiment of the present invention, in which FIG. 6 corresponds to FIG. 5, FIG. 7 corresponds to FIG. 3 and FIG. 8 corresponds to FIG. 4.
Figure 7:
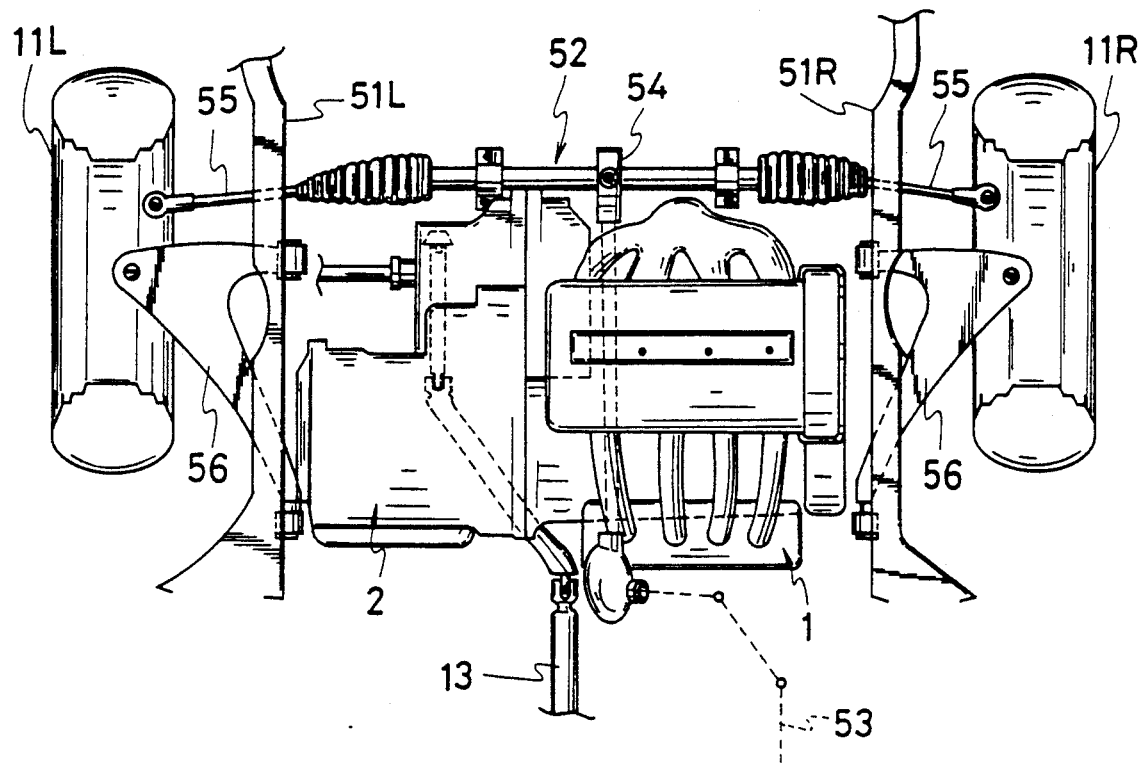
Figure 8:
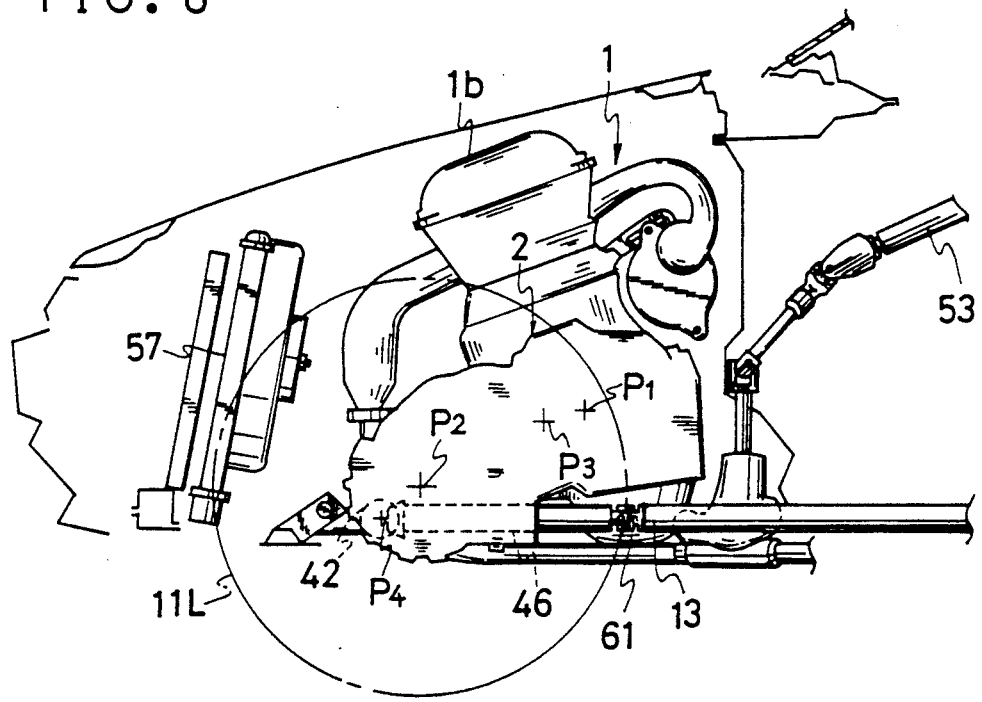

FIG. 6–FIG. 8 show the second embodiment of the present invention. In the case of this embodiment, the axial center $P_4$ of the transfer shaft 42 extending in the body width direction of the transfer mechanism which transmits driving torque from the center differential 7 to the rear wheel side is arranged in front of the axial center $P_2$ of the front axle and below $P_2$ and $P_1$ which is the axial center of the crank shaft 1a. The transmitting shaft 46 and the propeller shaft 13 extend substantially horizontally toward the rear of the vehicle body from the transfer shaft 42, passing the side of the oil pan 61 under the engine 1. The basic composition of the four-wheel drive system and the layout of arrangements of the engine 1, the transmission 2, etc. are the same as in the case of the first embodiment. Like reference numbers are given to the same members and explanation of them is omitted.

In the above second embodiment, too, the engine 1 and the transmission 2 are arranged at the center of the center differential 7 and the front differential 8, namely, in the rear of $P_2$ which is the axial center of the axle of the front wheels 11L, 11R and therefore, one-sided action of the vehicle body weight on the front wheels 11L, 11R can be relieved and improvement of running stability can be planned.

What is claimed is:

1. A four-wheel-drive motor vehicle comprising:
   a front differential and a center differential, said differentials being located in a front part of said vehicle and being coaxial with an axle line of front wheels of said vehicle;
   an engine disposed transversely in said front part;
   a transmission driven by said engine and disposed in said front part, said engine and transmission driving said front and center differentials and being positioned rearwardly of said front and center differentials; and
   a transfer shaft, driven by said center differential, for transmitting power from said engine to rear wheels of said vehicle, said transfer shaft being transversely disposed in said front part and positioned forwardly of said engine, said transfer shaft being positioned below said output shaft and rearward of said front wheel axle line.

2. A four-wheel-drive motor vehicle of transversely-disposed engine type as defined in claim 1, wherein the transmission is arranged in the rear of and above the center differential.

3. A four-wheel-drive motor vehicle of transversely-disposed engine type as defined in claim 1, wherein a steering shaft is arranged in the longitudinal direction of the vehicle body, passing below the engine.

4. A four-wheel-drive motor vehicle of transversely-disposed engine type as defined in claim 1, wherein a propeller shaft is arranged in the longitudinal direction of the vehicle body, passing below the engine.

5. A four-wheel-drive motor vehicle of transversely-disposed engine type as defined in claim 4, wherein a propeller shaft is arranged at the side of an oil pan below the engine.

6. A four-wheel-drive motor vehicle of transversely-disposed engine type as defined in claim 1, wherein the engine is arranged in such a fashion that a cylinder head side thereof inclines diagonally and frontwardly of said vehicle.

7. A four-wheel-drive motor vehicle of transversely-disposed engine type as defined in claim 1 wherein said transfer shaft is positioned forward of said front wheel axle line and below said output shaft.

* * * * *